US012697943B2

(12) United States Patent
Granata

(10) Patent No.: US 12,697,943 B2
(45) Date of Patent: Aug. 4, 2026

(54) SUPPORTING DEVICE AND METHOD FOR SUPPORTING

(71) Applicant: NEXION S.P.A., Correggio (IT)

(72) Inventor: Tebaldo Granata, Treglio (IT)

(73) Assignee: NEXION S.P.A., Correggio (IT)

( * ) Notice: Subject to any disclaimer, the term of this patent is extended or adjusted under 35 U.S.C. 154(b) by 301 days.

(21) Appl. No.: 18/404,352

(22) Filed: Jan. 4, 2024

(65) Prior Publication Data

US 2024/0227745 A1 Jul. 11, 2024

(30) Foreign Application Priority Data

Jan. 5, 2023 (IT) ........................ 102023000000081

(51) Int. Cl.
| | |
|---|---|
| *B60S 9/12* | (2006.01) |
| *B25H 5/00* | (2006.01) |
| *B25J 5/00* | (2006.01) |
| *B60L 53/80* | (2019.01) |
| *B60S 9/10* | (2006.01) |
| *B60S 9/22* | (2006.01) |
| *B66F 3/24* | (2006.01) |

(52) U.S. Cl.
CPC .................. *B60S 9/12* (2013.01); *B25H 5/00* (2013.01); *B25J 5/007* (2013.01); *B60L 53/80* (2019.02); *B60S 9/10* (2013.01); *B60S 9/22* (2013.01); *B66F 3/247* (2013.01)

(58) Field of Classification Search
CPC ..... B60S 9/12; B60S 9/22; B60S 9/10; G05B 2219/45064; B66F 7/16; B66F 3/247; B60L 53/80; B25H 5/00; B25J 5/007
See application file for complete search history.

(56) References Cited

U.S. PATENT DOCUMENTS

| | | | |
|---|---|---|---|
| 10,427,653 B2 * | 10/2019 | Fong | |
| 10,442,411 B2 * | 10/2019 | Kinder | |
| 2006/0163859 A1 * | 7/2006 | Lehman | |
| 2011/0210298 A1 | 9/2011 | Bonacini | |
| 2018/0251102 A1 | 9/2018 | Han | |

FOREIGN PATENT DOCUMENTS

| | | | | |
|---|---|---|---|---|
| CN | 106965143 A | | 7/2017 | |
| EP | 2756934 B1 | | 9/2019 | |
| JP | 2000063092 A | * | 2/2000 | |
| KR | 20220142455 A | * | 10/2022 | .............. B60L 53/14 |
| NL | 1004956 C2 | * | 7/1998 | ................ B66F 3/46 |

OTHER PUBLICATIONS

Search Report and Written Opinion from Italian Patent Application No. 102023000000081, Search completed Jun. 26, 2023, 6 pages.

* cited by examiner

*Primary Examiner* — James A Shriver, II
*Assistant Examiner* — Nicholas R. Kandas
(74) *Attorney, Agent, or Firm* — CHRISMAN GALLO TOCHTROP

(57) ABSTRACT

This invention relates to a supporting device, particularly for components of vehicles to be disassembled and/or assembled.
The device comprises a wheeled stand (2) which can move over ground (A) and supports a central pedestal (4), and a plurality of arms (5), coupled with respective first ends (5a) to the pedestal (4).
Each arm (5) supports a respective linear actuator (6) configured to lift a corresponding supporting pad (7) and to stop its own lifting stroke when the pad (7) butts against an obstacle.

9 Claims, 6 Drawing Sheets

SUPPORTING DEVICE AND METHOD FOR SUPPORTING

This invention has for an object a supporting device and a method for supporting, particularly for electric vehicle battery cells or other components.

As is known, automobile manufacturers are proposing an ever increasing number of vehicles equipped with electric motors which operate independently and autonomously or in conjunction with other types of engines, all with the common aim of propelling the vehicles in accordance with criteria based on energy saving, reduced environmental impact and greater eco-sustainability.

Consequently, there is a growing need to provide service for the inspection, maintenance, repair and/or (above all) replacement of electric battery cells, capable of ensuring that the electric motor mounted on any vehicle has an efficient power supply, according to the criteria and technology specific to it.

As is known, the battery is normally mounted at the bottom of the vehicle and can be accessed by removing a panel it is attached to.

Devices are therefore known (for example from the patent documents CN106965143A, US2018/251102A1, US2011/210298A1 ed EP2756934B1) which can be positioned under the vehicle (which must first be lifted off the ground) so that the battery can be disassembled and/or subsequently re-assembled.

More in detail, these devices usually consist of lift trolleys that support a platform provided with lifting means: to remove the battery from the vehicle, the lift trolley is placed under the vehicle and the platform raised until it abuts against the battery mounting panel.

Once this condition has been reached, the platform is able to support the weight of the panel and battery: thus, by acting on the fastening bolts (or similar fastening elements), the panel can be detached from the vehicle and the battery removed and lowered by lowering the platform and moved away on the trolley.

This constructional solution is not free of disadvantages, however.

In many cases, when the vehicle is lifted off the ground, the bottom of it is not perfectly aligned with the ground on account of tilting to the right or left, however slight, on account of minor imperfections of the lift or, generally, of the device responsible for lifting.

On the other hand, the platform defines a perfectly horizontal resting plane; hence, when the platform butts against the door, the imprecise alignment leads to problems and complications of various kinds, which may in some cases have a negative impact on some of the components (for example, damage to the threading when undoing the bolts).

Putting the battery back in place on the vehicle is also affected by the same problem.

The main purpose of this invention is to overcome the above-mentioned drawbacks by providing a supporting device which offers practical methods of disassembling and assembling the batteries of cars or other electrical vehicles.

In the context of this purpose, this invention has for an aim to provide a supporting device which allows the battery to be disassembled and assembled even when the electric vehicle, which has been lifted for this purpose, is inclined with respect to the ground.

Another aim of the invention is to provide a device which can be placed easily under the vehicle at the optimum position to facilitate battery replacement operations.

Another aim of the invention is to provide a device which ensures a high level of operational reliability.

Another aim of the invention is to propose a device whose technical and structural architecture is alternative to those of devices known in the prior art.

Yet another aim of the invention is to provide a device that can be easily made from components and materials readily available on the market.

A yet further aim of the invention is to provide a device that is inexpensive and can be safely applied.

This purpose and these and other aims which will become apparent below are achieved by a supporting device and a method, particularly for components of vehicles to be disassembled and/or assembled, characterized in that it comprises a wheeled stand which can move over ground and supports a central pedestal, and a plurality of arms, coupled with respective first ends to said pedestal, each of said arms supporting a respective linear actuator configured to lift a corresponding supporting pad and to stop its own lifting stroke when said pad butts against an obstacle.

The present invention provides a supporting device for disassembling and/or assembling vehicle components. The device includes a wheeled stand. In one example, the device supports a central pedestal. In another example, the device supports at least one arm constrained with a respective first end to the base; preferably, the device supports a plurality of arms, coupled with respective first ends to the pedestal. Each arm (or each of said arms) supports a respective linear actuator. The linear actuator can be configured to lift a corresponding supporting pad; for example, the support pad is connected to the linear actuator. The linear actuator can be configured to stop its lifting stroke when the pad abuts against an obstacle.

The present invention also provides a method for supporting vehicle components to be disassembled and/or assembled. The method includes a phase of preparing a wheeled stand. In one example, the device supports a central pedestal. In another example, the device supports at least one arm constrained with a respective first end to the pedestal; preferably, the device supports a plurality of arms, constrained with respective first ends to the pedestal. Each arm (or each of said arms) supports a respective linear actuator.

The method includes a lifting phase, through the linear actuator, of a corresponding support pad. The method also includes a phase of stopping the lifting stroke of the linear actuator, when said pad abuts against an obstacle.

Further features and advantages of the invention are more apparent in the description of a preferred but non-exclusive embodiment of the supporting device according to the invention, illustrated by way of non-limiting example in the accompanying drawings, in which.

Figure 1:
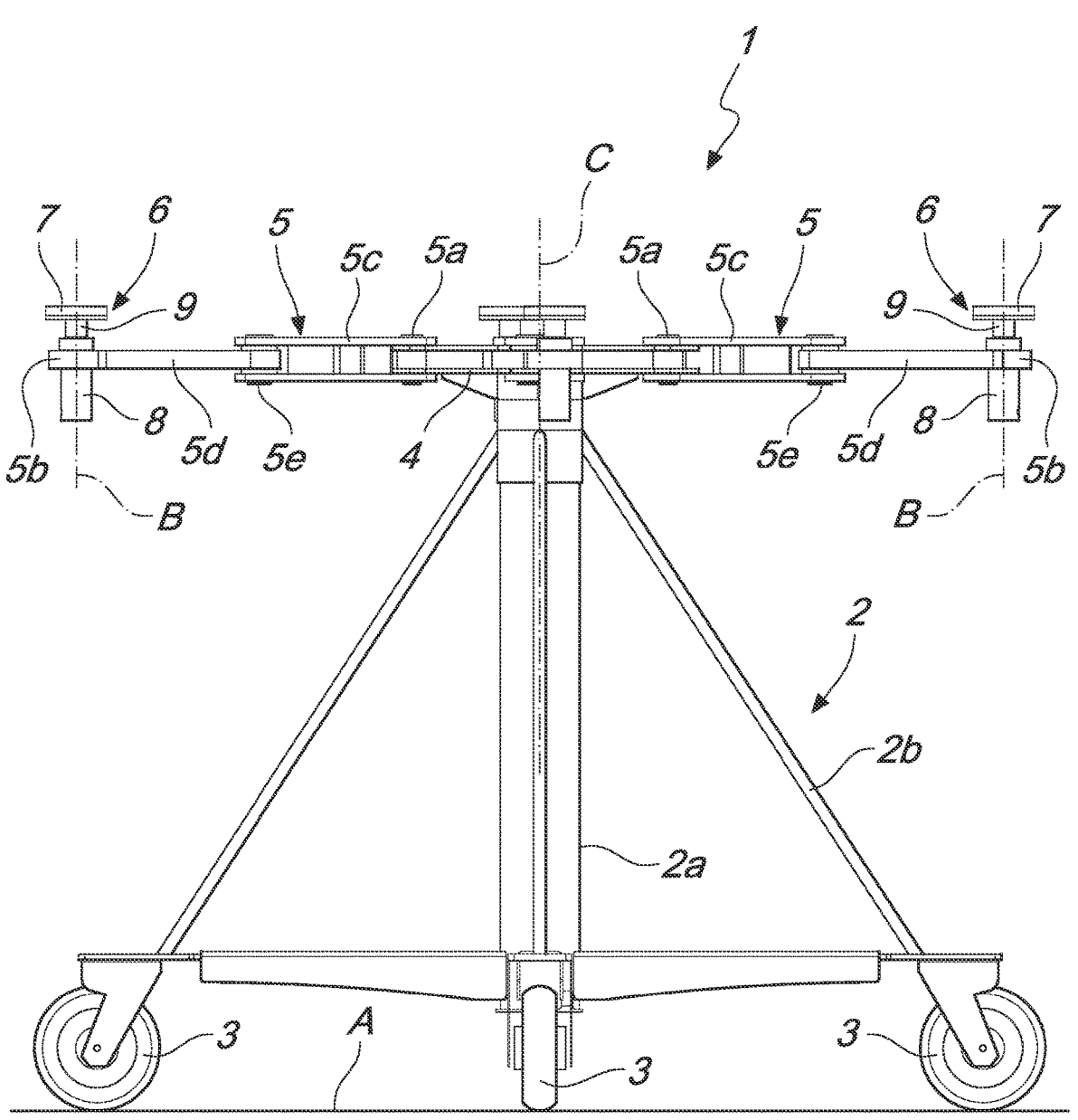
FIG. 1 shows the device of the invention in a front elevation view.
Figure 2:
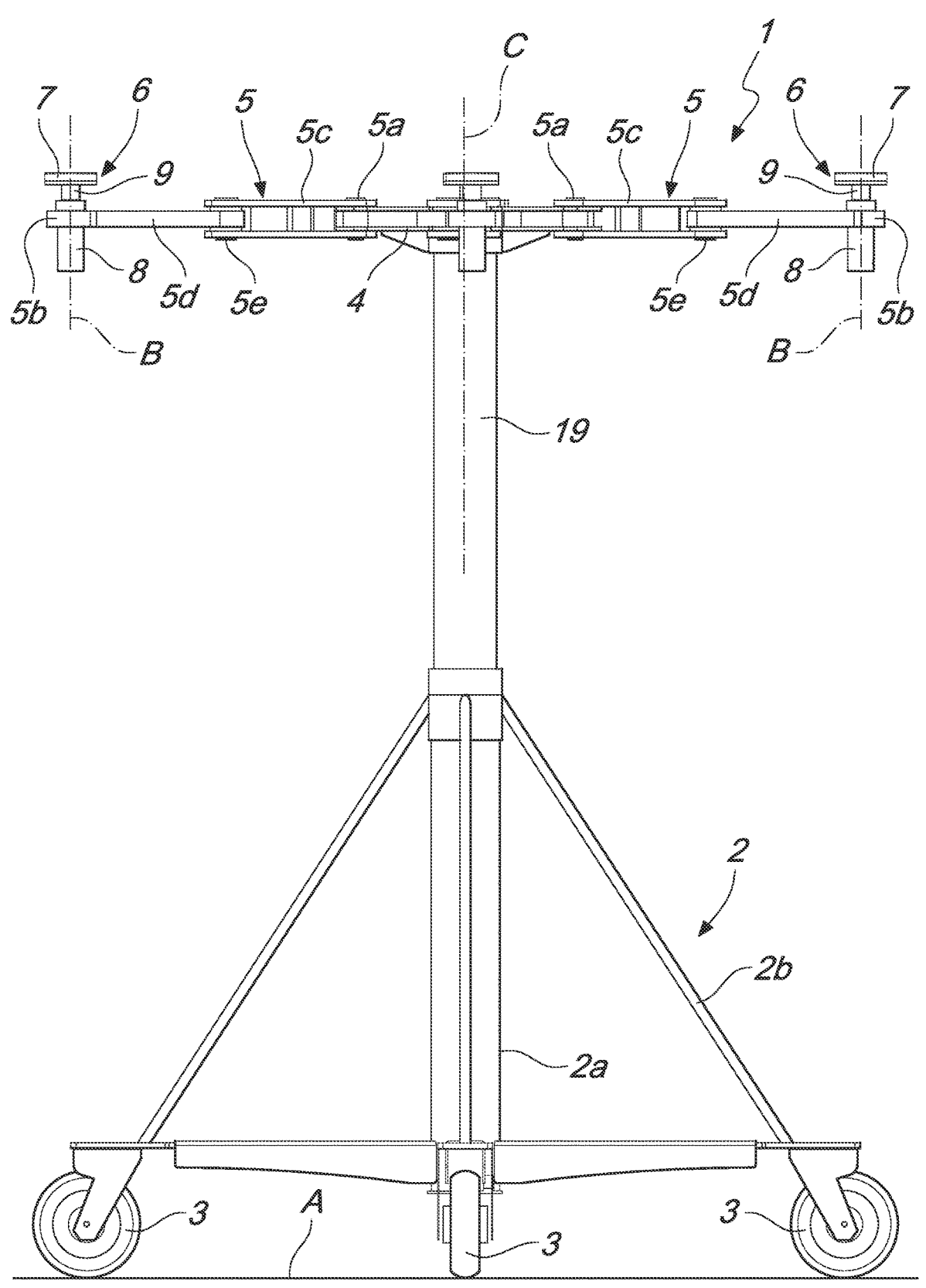
FIG. 2 shows the device of FIG. 1 in a front elevation view as in FIG. 1 and with the pedestal positioned at a greater vertical elevation.
Figure 3:
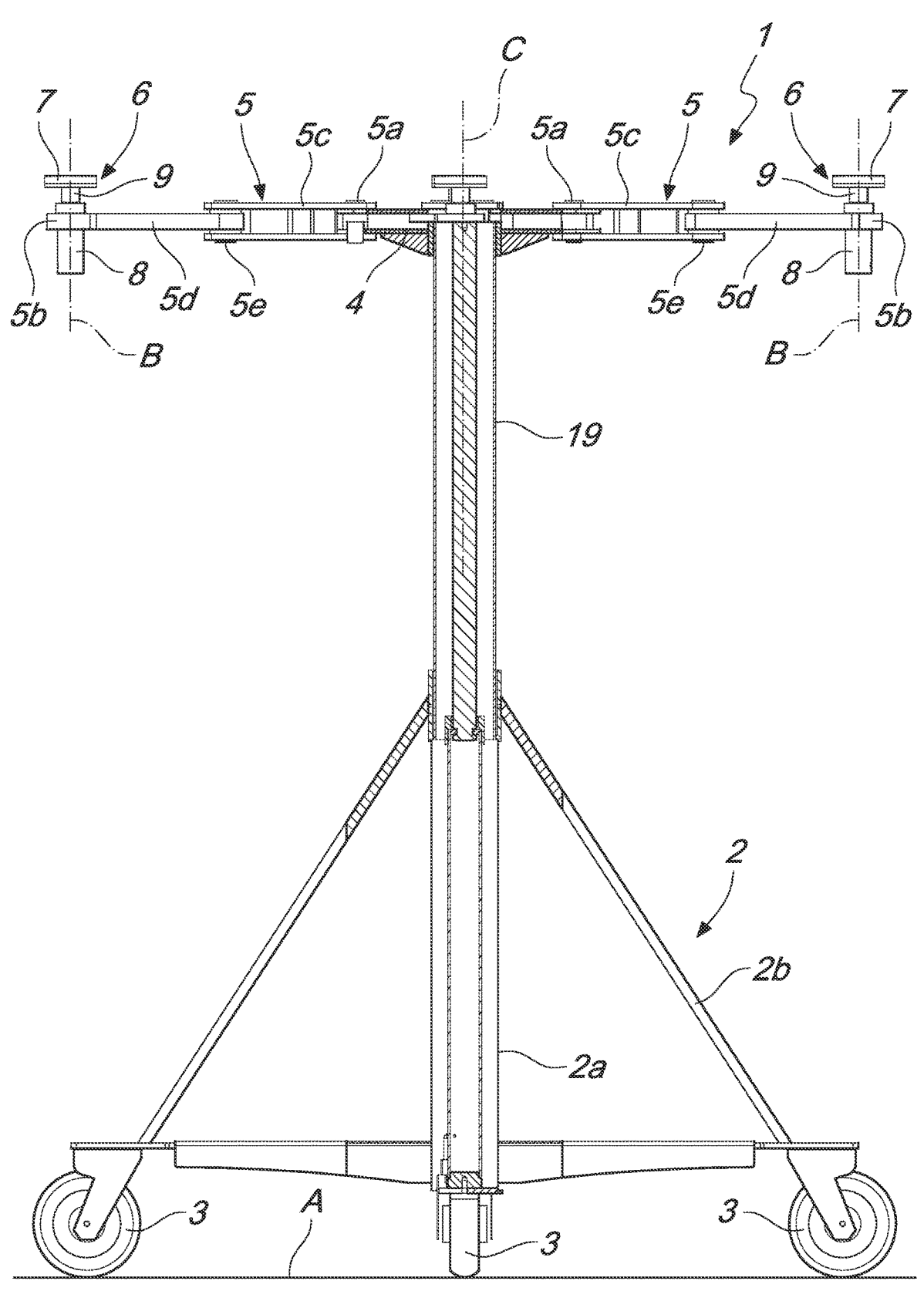
FIG. 3 is a cross section of FIG. 2, through a vertical plane.
Figure 4:
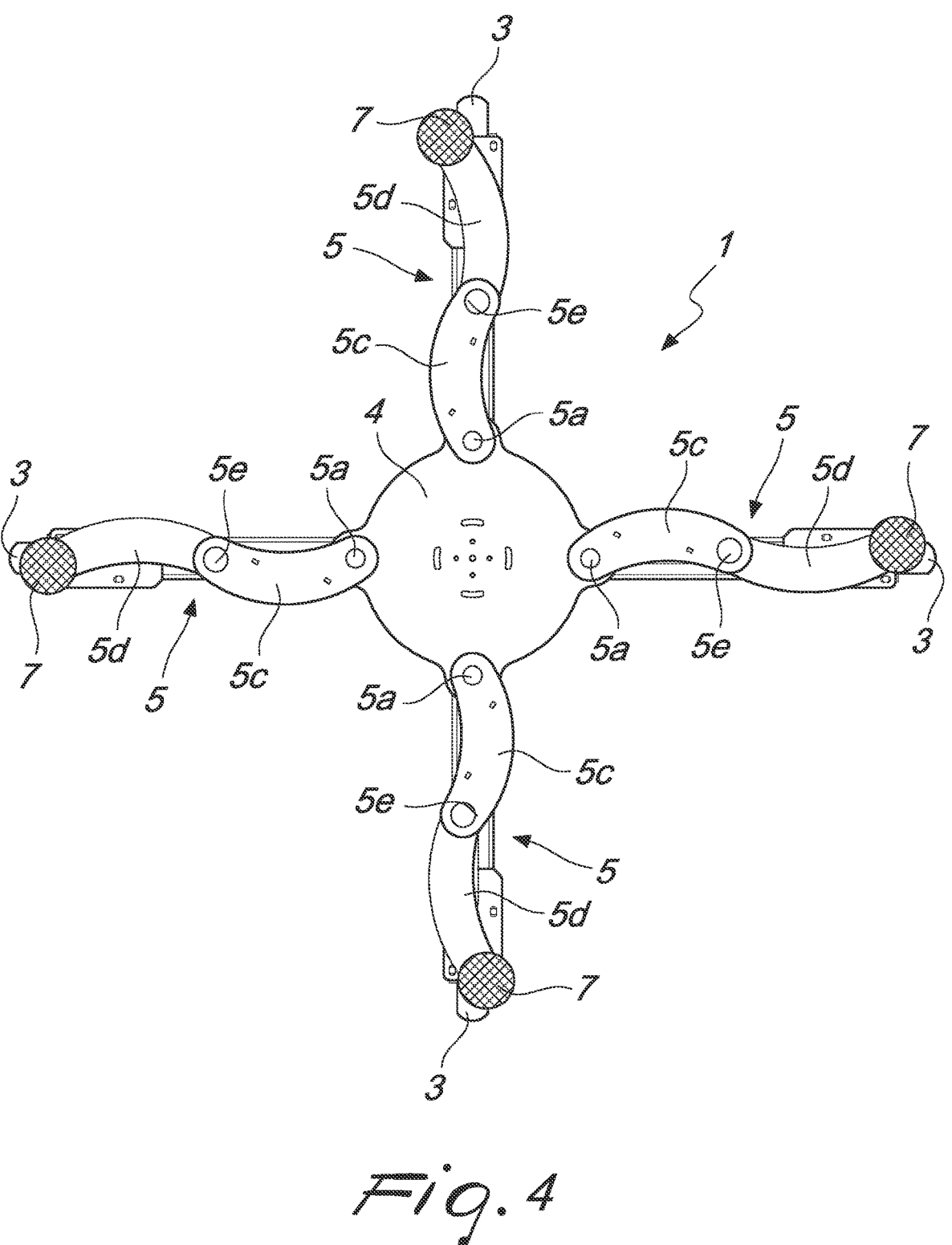
FIG. 4 shows the device of FIG. 1 in a view from above.
Figure 5:
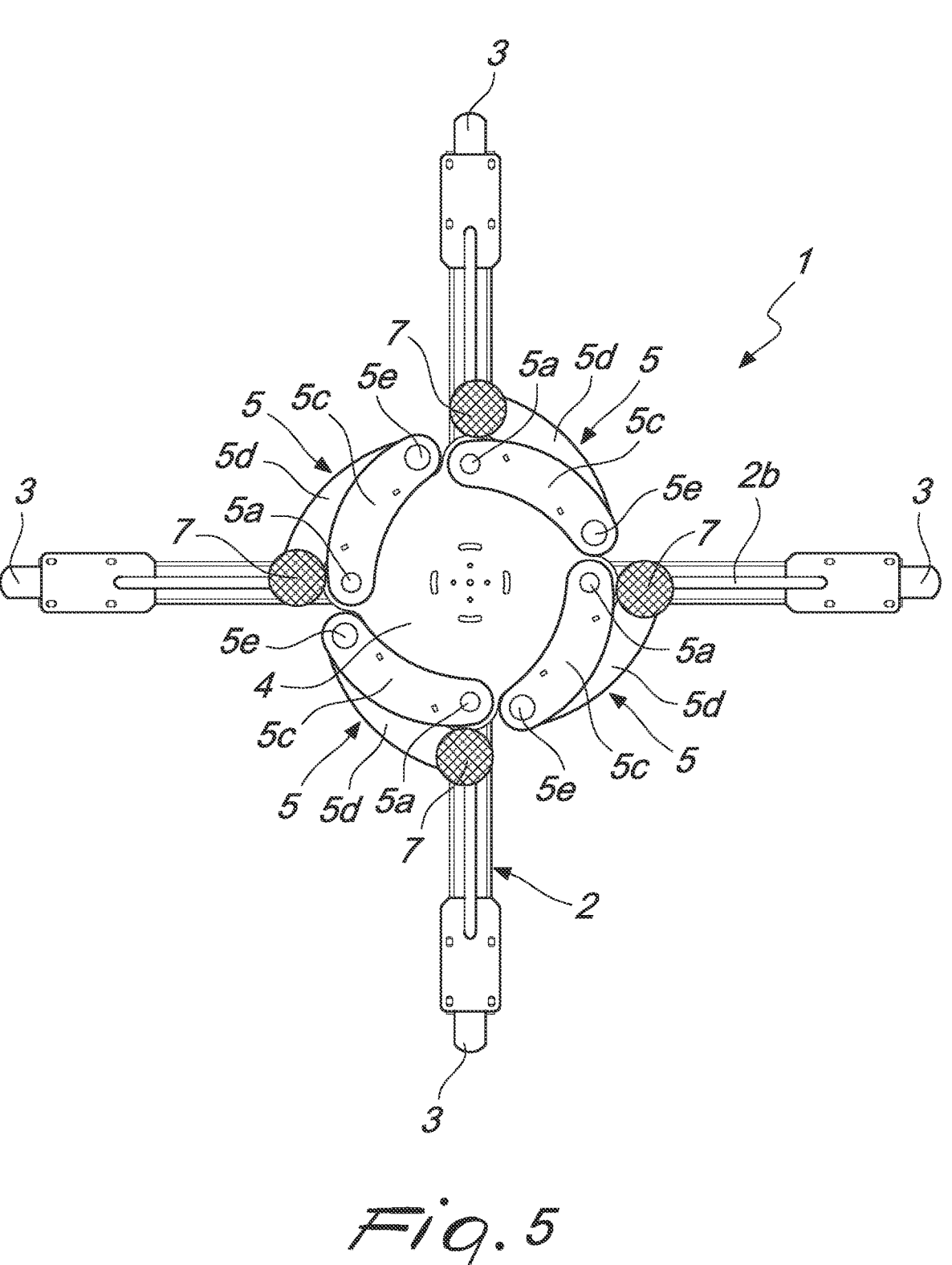
FIG. 5 shows the device of FIG. 1 in a view from above, as in FIG. 4, but with the arms arranged differently.

With reference to the drawings listed above, the numeral 1 denotes in its entirety a supporting device, in particular for components of vehicles to be disassembled and/or assembled (or reassembled) for the purposes of replacement, repairs, maintenance, inspection and so on.

Still more particularly, in the preferred embodiment, the device 1 can be used to disassemble and/or (re)assemble the cell battery of an electric car (meaning by this term not only cars propelled solely by an electric motor but also hybrid vehicles.

In the same way, it is understood that the scope of the protection claimed herein can also be extended to assembling, disassembling and/or simply supporting other parts or components of electric or other vehicles, where an expert in the field would consider advantageous using the specific features described hereinunder.

According to this invention, the device 1 comprises, first of all, a stand 2 which can move over ground A thanks, for example, to wheels 3. It should be noted that, clearly, the arrangement of the wheels 3 and, generally, the shape of the wheeled stand 2 (which may be of any kind, without departing from the scope of the protection claimed herein) uniquely identify an ideal resting plane of the wheeled stand 2 (which, in use, coincides with the ground A).

Any use of the terms "horizontal" and "vertical" made hereinunder shall be understood solely with reference to such ideal resting plane, the only one relative to which the wheeled stand 2 (and the device 1) can operate.

While stressing that any other form falls within the scope of the protection claimed herein, in the embodiment illustrated in the accompanying drawings, the wheeled stand 2 comprises a central post 2a and a reticulated supporting structure 2b to which the (four) wheels 3 are rotatably coupled.

The wheeled stand 2 thus allows the device 1 to be moved as required and in the preferred embodiment, this allows placing it under the vehicle (after the vehicle has been raised according to any known method) to allow interacting with the component to be operated on.

The wheeled stand 2 supports a central pedestal 4 which, for example, may comprise a board or deck disposed parallel to the ground A. More in detail, in the embodiment shown in the accompanying drawings, the pedestal 4 comprises two superposed boards, joined to each other and mounted on top of the post 2a of the wheeled stand 2.

According to the invention, the device 1 also comprises a plurality of arms 5 which are coupled with respective first ends 5a to the pedestal 4.

In the accompanying drawings, there are four arms 5 distributed uniformly around the pedestal 4 (in particular, with their first ends 5a) but the scope of the protection claimed herein extends to devices 1 provided with any suitable number of arms 5 distributed uniformly or irregularly around the pedestal 4, depending on specific requirements.

It should also be noted that each arm 5 is preferably horizontal (parallel to the ideal resting plane or to the ground A), but positioning it so that it is slightly inclined to the horizontal, to varying degrees, is also imaginable.

Also, according to the invention, each arm 5 supports a respective linear actuator 6 configured to lift a corresponding supporting pad 7 and to stop its own lifting stroke (independently of the stroke and stopping of the other actuators 6) when the pad 7 butts against an obstacle (which may be the element to be disassembled or to be supported).

In the preferred embodiment, as will become clearer below, the lifting stroke is stopped automatically but it is understood that this invention does not exclude devices 1 where an operator is responsible for stopping the lifting motion as soon as they perceive that the pad 7 has butted against the obstacle.

After stopping, support for the pad 7 and whatever it has butted against is provided by the actuator 6 until deactivated.

In particular, in the preferred, non-limiting embodiment of the invention, each actuator 6 comprises a cylinder 8 rigidly coupled to the respective arm 5, and a piston 9, capable of movement relative to the cylinder 8 in translation along a working axis B at right angles to the ideal resting plane of the wheeled stand 2 (in simpler terms, therefore, relative translation occurs along a vertical direction). Each pad 7 is anchored to the free end of the respective piston 9, at the end opposite the corresponding cylinder 8.

Preferably (but not necessarily) the cylinder 8 is located substantially at the second end 5b of the arm 5, opposite the first end.

Usefully, the device 1 comprises a circuit 10 for controlling and driving the actuators 6 (whether or not they comprise cylinders 8 and pistons 9). The circuit 10 is preferably oil-hydraulic (with oil flowing through it) but it could also be of other kinds (hydraulic or pneumatic, for example).

In particular, in the preferred embodiment, the circuit 10 comprises a main branch 11 (which may have pressurized fluid (oil or other fluid) flowing through it and which is configured to move the pistons 9, and a plurality of auxiliary branches 12, interposed between the main branch 11 and the respective cylinders 8. In other words, the fluid can flow in the main branch 11 and then, through the auxiliary branches 12, can reach a space inside the cylinders 8 so as to push each piston 9 (along the working axis B) towards the opposite end. The pressurized fluid provides the necessary force to support the pad 7 and whatever is resting on it.

Each auxiliary branch 12 and/or the main branch 11 are shut off by a respective shutoff valve 13 which can be selectively activated to stop sending fluid to the cylinders 8, hence stopping the translational movement of the pistons 9 (but without affecting the supporting force).

Figure 6:
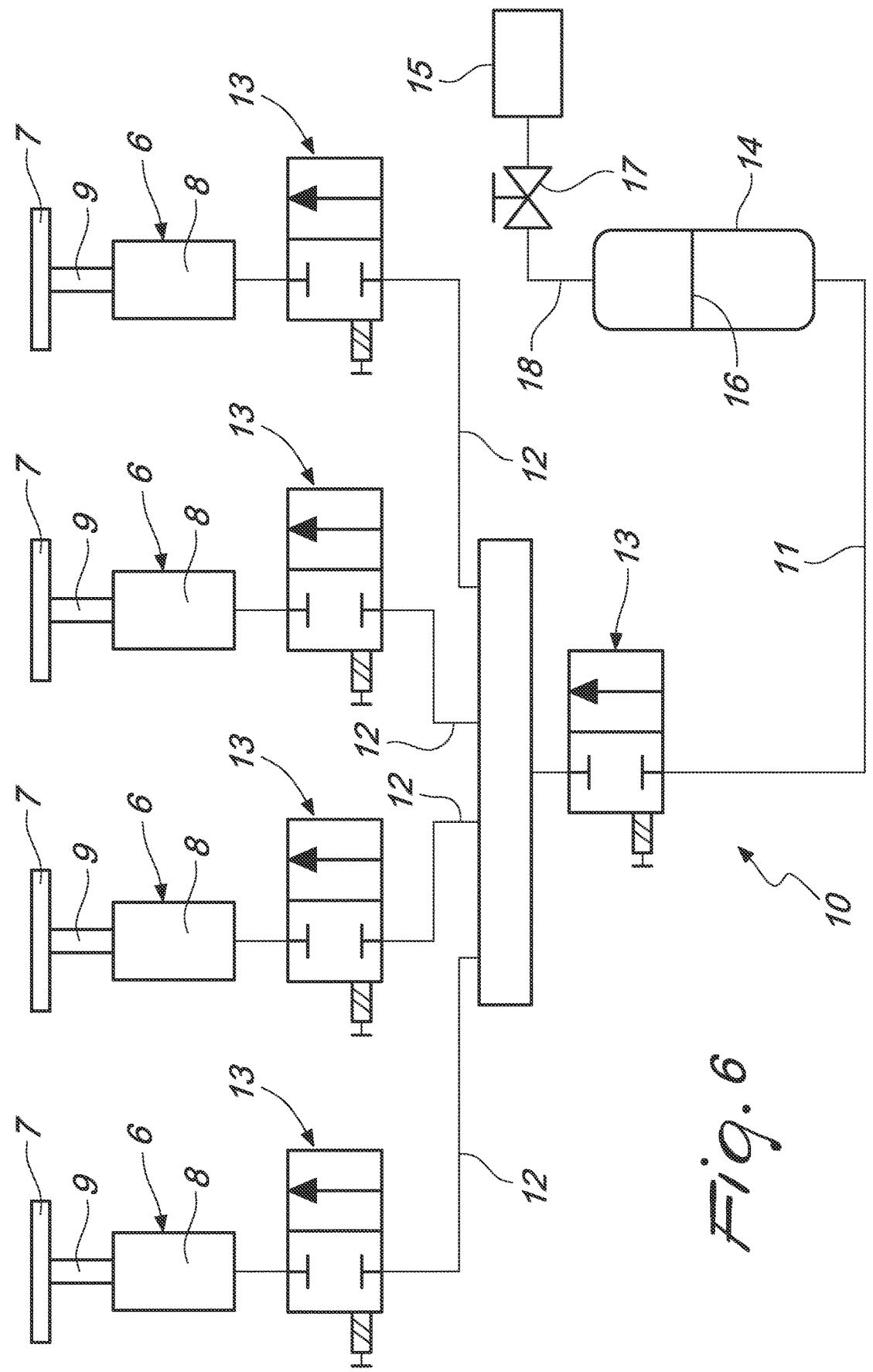
FIG. 6 is a simplified schematic representation of a sub-assembly of the device of FIG. 1.

For convenience of illustration, the circuit 10 is not shown in FIGS. 1-5 but it is clearly illustrated in block diagram form in FIG. 6: in practice, the circuit 10 may be practically embodied and integrated in the device 1 in any suitable manner, depending on requirements and the state of the art.

In the preferred, non-limiting embodiment of the invention, the valve 13 (each valve 13) is an electric valve.

Precisely with reference to the preferred, but non-exclusive, embodiment and to FIG. 6, the circuit 10 comprises a tank 14 containing the fluid (from where it can be sent to the branches 11, 12) and which is placed in communication with a compressed air supply unit 15 for the forced conveyance of the fluid toward the main branch 11 and the auxiliary branches 12.

More in detail, the air supplied by the unit 15 (which might be a unit 15 outside the device 1) is sent to the tank 14 where, acting on a separator 16, it forces the fluid to flow along the branches 11, 12 under pressure to reach the cylinders 8, where it can push the pistons 9 and support the pads 7.

To empty the circuit 10 at least partly to allow lowering the pads 7 automatically (by gravity), it is possible to operate on a tap 17, located along the compressed air delivery stretch 18 (between the unit 15 and the tank 14) so that the air can be pushed out.

Advantageously, the pedestal 4 is supported by the wheeled stand 2 with the possibility of relative translational movement along a main axis C, at right angles to the resting plane of the wheeled stand 2 itself (in more simple terms, therefore, the relative translational movement occurs along a vertical direction, as for the pistons 9 and the pads 7).

For this purpose, for example, the pedestal 4 can be mounted at the top of a rod 19 which is slidable telescopically relative to the post 2*a* of the wheeled stand 2. Providing the pedestal 4 with the possibility of relative translational movement with respect to the wheeled stand 2 in another way is also imaginable, however.

Whatever the case, the feature just described allows lifting or lowering the pedestal 4 to move the arms 5 and the pads 7 as close as possible to the vehicle or at least to the component to be supported, before enabling the translational movement of the pads 7 (whose stroke is typically more limited).

Positively, each arm 5 is articulated to the pedestal 4 about the respective first end 5*a* so as to be able to vary the position of each pad 7 relative to the other pads and relative to the pedestal 4 in order to find the best possible position under the component to be lifted (or, vice versa, to move the object resting on the pads 7 freely even if the wheeled stand 2 is stationary).

More particularly, in the preferred, non-exclusive embodiment, each arm 5 comprises at least one first member 5*c* and one second member 5*d* which are mutually articulated at a common end 5*e* (there may also be more than two members 5*c*, 5*d*). A first member 5*c* provided with the first end 5*a*, opposite the common end 5*e* of the arm 5, is coupled to the pedestal 4, while a second member 5*d*, opposite the common end 5*e* supports the respective actuator 6.

It is evident that choosing to make the arm 5 in this way allows further increasing the number of positions which each pad 7 can be placed at and/or the possibility of moving the object resting on the pads.

The supporting device according to this invention works as follows.

As mentioned above, the wheeled stand 2 can be moved over the ground A until it is positioned under a vehicle and, more specifically, under the bottom-mounted panel which the battery is fixed to.

Hereinunder, reference is made to the use of the device 1 to replace a battery but the description is applicable to assembling/disassembling any other vehicle component, or other object or element to be temporarily supported with the device 1, thanks to the specific features of the device.

At the working position (the position where disassembly or assembly can be carried out), not only must the wheeled stand 2 be positioned under the vehicle, and more specifically, under the panel, but it is also necessary to ensure that the panel itself is close to the pads 7 (along the translational stroke the pads are permitted to travel). For this purpose, therefore, the pedestal 4 could, if necessary, be raised vertically (or the vehicle lowered) relative to the wheeled stand 2.

To ensure optimum support, as seen above in the case of the preferred embodiment, each pad 7 could also be moved relative to the pedestal 4 by rotating each arm 5 about the respective first end 5*a* and/or moving the second member 5*d* relative to the first.

That way, the pads 7 can be better distributed, taking into account the shape of the vehicle and of the panel and of any obstacles.

Thus, after finding the optimum position of the wheeled stand 2, of the pedestal 4 and of the pads 7, the actuators 6 can be activated, hence the pads 7 (simultaneously) raised. Preferably, but not necessarily, this result is obtained by supplying compressed air via the unit 15 in order to pressurize the fluid in the circuit 10.

The upstroke of each pad 7 stops (preferably automatically) when the pad butts up (from below) against an obstacle, which, in this case, is the corresponding portion of the panel.

In this context, therefore, it should be noted that if the vehicle and the panel in particular are perfectly parallel to the ground A, all the pads 7 stop simultaneously.

In a very special and innovative way, any imbalance or tilting of the vehicle and panel (due, for example, to faulty operation of the vehicle lift) do not have any negative effect on the operation of the device 1 and, above all, on the successful outcome of the subsequent disassembly (or reassembly) operations.

In effect, each pad 7 can stop its movement independently of the others once it comes into contact with the respective portion of the panel and thus, when all the pads 7 are in abutment against the panel (even if the respective strokes differed in length) the panel is in any case supported in an optimal and uniform manner.

Once the pads 7 have stopped (thanks to the pressurized fluid, for example) their function then becomes that of supporting the weight of the panel (and of the battery) and the operator can proceed to act on the fastening bolts or in any case to uncouple the panel from the vehicle, while the battery remains perfectly supported on the pads 7.

By lowering the pedestal 4 (or raising the vehicle) it is thus possible to work easily on the battery for any reason, be it repair, inspection maintenance or replacement.

Obviously, in the same way, the device 1 also ensures correct reassembly of the panel and battery, which can be put back into place (while they are being supported by the device 1) while compensating for any vehicle imbalance.

For this purpose, as seen above, the rotation of the arms 5 and of the members 5*c*, 5*d* enhances the versatility of the invention, making it possible to position the pads 7 as required relative to the pedestal 4.

The possibility of moving the pads 7 as required is most useful precisely during (re)assembly of the battery, in that they can be moved when the battery is already resting on them, making it possible to move it easily under the vehicle to correct its position and align it perfectly with its destination housing (without having to move the entire wheeled stand, as is the case with prior art solutions). Once aligned, the battery can be raised (for example, again using the actuators 6 and the action of the pressurized fluid) and put back into its housing, once again quickly and easily and without excessive effort on the part of the operator.

Generally speaking, therefore, tightening or undoing the fastening bolts are made extremely easy, without the risk of damaging the internal threading (as sometimes occurs in prior art solutions in the case of tilting or imbalance or generally when the battery is not resting perfectly on the reference surface).

Returning to initial working conditions, lowering the pads 7 and bringing them to the starting position, can be carried out in any suitable manner, depending on the specific embodiment chosen: in the preferred embodiment, as seen above, it is sufficient to open the tap 17 to empty the delivery stretch 18 of compressed air. The pads 7 can be lowered by gravity while the fluid flows in the circuit 10 in the opposite direction.

The pads 7 of the device 1 of the invention thus ensure perfect contact and support of the battery (or any other component or element to be operated on) under any working conditions. On contact with an obstacle, each pad 7 stops independently of the others, producing a "self-levelling" effect which ensures that the battery is supported in the optimum manner.

As seen, the mutually independent strokes of the pads 7 and the support provided after they stop are obtained, in the preferred embodiment, by sending oil or other pressurized fluid to the cylinders 8, thereby pushing the pistons 9 (and the pads 7) upwards until they butt against the panel (or other obstacle), after which the function of the pressurized fluid is that of supporting the weight of the panel and battery. For this purpose, holding the position reached by each pad 7 can be ensured by the valves 13 which, after shutting off the branches 11, 12, prevent the fluid in the circuit 10 from flowing in the opposite direction. Other means of ensuring that the pads 7 continue providing support are also imaginable, whether the pads are associated with a circuit 10 or not.

In practice, it has been found that the device of the invention fully achieves the preset aim, in that using a plurality of arms 5 which support respective actuators 6 for lifting corresponding pads 7 capable of stopping when they butt against the battery panel or other obstacle, provides a practical means of disassembling and assembling the battery of a car or other electric vehicle. Such operations can thus be carried out much more quickly (compared to traditional methods) because the operator need no longer worry about potential damage or problems due to undesirable vehicle tilting or imbalance.

In effect, the device 1 allows the battery to be disassembled and assembled even when the electric vehicle, which has been lifted for this purpose, is inclined with respect to the ground A.

The invention described above may be modified and adapted in several ways without thereby departing from the scope of the inventive concept; moreover, all the details of the invention may be substituted by technically equivalent elements.

In the embodiments illustrated, single features described in connection with specific examples could in fact be replaced by other, different features existing in other example embodiments.

In practice, the device of the invention may be made from any materials and in any size, according to requirements and the state of the art.

The invention claimed is:

1. A supporting device, particularly for components of vehicles to be disassembled and/or assembled, characterized in that it comprises a wheeled stand which can move over ground and supports a central pedestal, and a plurality of arms, coupled with respective first ends to said pedestal, each of said arms supporting a respective linear actuator configured to lift a corresponding supporting pad and to stop its own lifting stroke when said pad butts against an obstacle.

2. The device according to claim 1, wherein each of said linear actuators comprises a cylinder which is rigidly coupled to the respective arm and a piston which can perform a relative translation with respect to said cylinder, along a working axis which is perpendicular to the resting plane of said wheeled stand, each of said pads being anchored to the free end of the respective piston, on the opposite side with respect to the corresponding cylinder.

3. The device according to claim 2, comprising a preferably hydraulic circuit for controlling and actuating said actuators.

4. The device according to claim 3, wherein said circuit comprises a main branch, which can be traversed by a pressurized fluid configured to move said pistons, and a plurality of auxiliary branches, interposed between said main branch and the respective cylinders, each of said auxiliary branches and/or said main branch being affected by a respective flow control valve, which can be activated selectively to interrupt the delivery of fluid to said cylinders and consequently hinder the translation of said pistons.

5. The device according to claim 4, wherein said valve is an electric valve.

6. The device according to claim 4, wherein said circuit comprises a fluid containment tank placed in communication with a compressed air supply unit for the forced conveyance of the fluid toward said main branch and said auxiliary branches.

7. The device according to claim 1, wherein said pedestal is supported by said wheeled stand so that it can perform a relative translation along a main axis, at right angles to the resting plane of said wheeled stand.

8. The device according to claim 1, wherein each of said arms is articulated to said pedestal about the respective first end.

9. The device according to claim 1, wherein each of said arms comprises at least one first member and one second member which are mutually articulated at a common end, a first member provided with said first end, opposite said common end (5e), being coupled to said pedestal, a second member supporting, opposite said common end, the respective actuator.

* * * * *